April 7, 1959  J. J. FARES  2,880,631
DUPLICATING DRILL JIG
Filed July 15, 1955  2 Sheets-Sheet 1
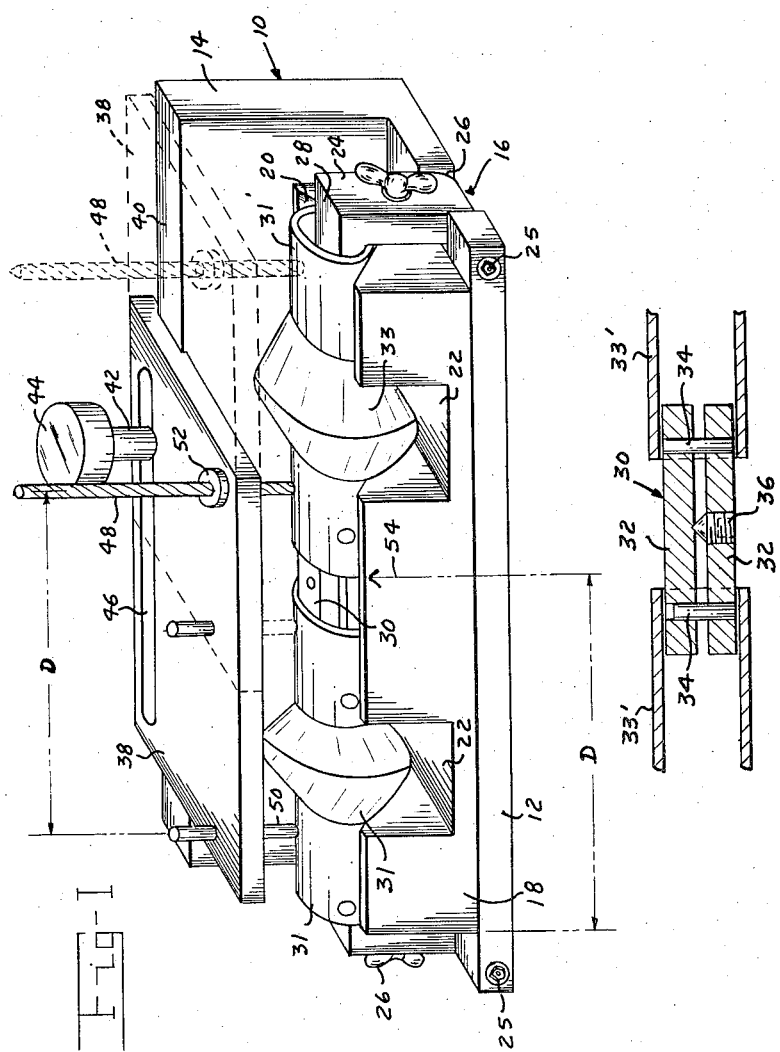
INVENTOR.
JAMES J. FARES
BY
ATTORNEYS April 7, 1959        J. J. FARES        2,880,631
DUPLICATING DRILL JIG
Filed July 15, 1955        2 Sheets-Sheet 2
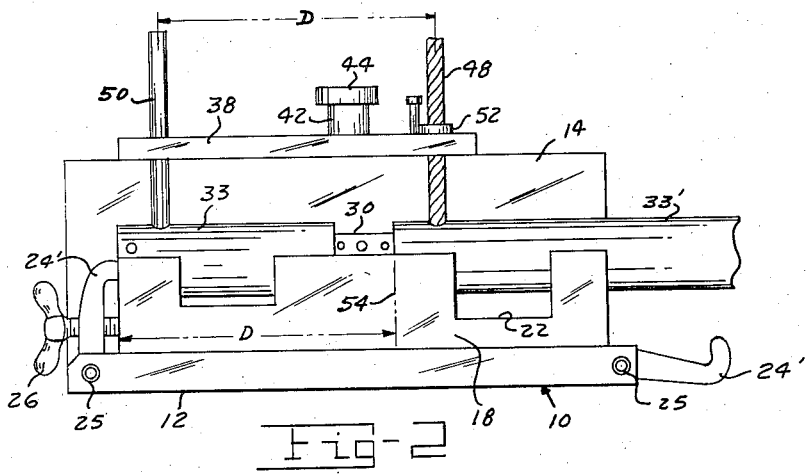
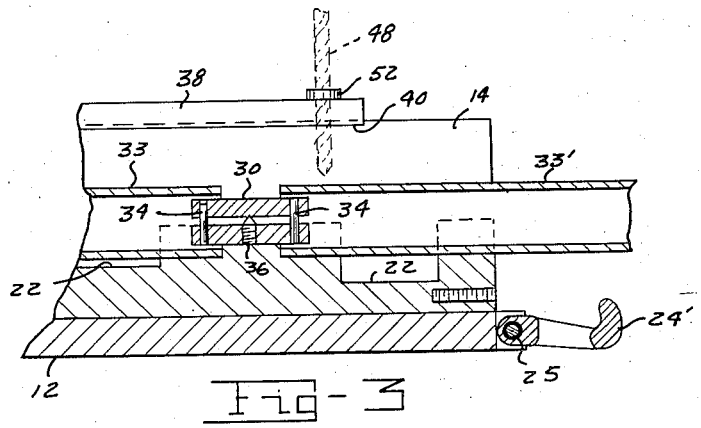
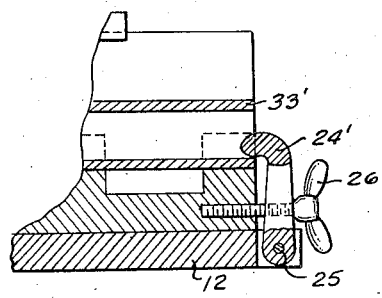
INVENTOR.
JAMES J. FARES
BY
ATTORNEYS United States Patent Office 2,880,631
Patented Apr. 7, 1959

2,880,631

DUPLICATING DRILL JIG

James J. Fares, Dayton, Ohio

Application July 15, 1955, Serial No. 522,407

3 Claims. (Cl. 77—62)

(Granted under Title 35, U. S. Code (1952), sec. 266)

The invention described herein may be manufactured and used by or for the United States Government for governmental purposes without payment to me of any royalty thereon.

This invention relates to a duplicating drill jig, and more particularly to a jig for use in preparing and duplicating parts such as joints, control tubes, gear boxes, aircraft universal joints, clevices and the like.

Since aircraft controls are manipulated with gear boxes and sprocket couplings, which have no vernier adjustments, the only means of aligning the controls is to drill the control tubes and universal joints on assembly. This means that the holes drilled will not be uniform nor will they usually be parallel or centered to any point. When for any reason it is desired to replace joints, tubes or gear boxes, it is very important, in fact imperative to redrill the new parts exactly the same as the part to be replaced. If this cannot be done, the whole assembly has to be replaced.

The object of the present invention is the provision of a jig, which overcomes these difficulties and one wherein a new part which is the exact dipulicate of the part being replaced can be produced, thus rendering the replacement of the whole assembly unnecessary.

Another object is the provision of an adjustable drilling jig whereby a part having predetermined drilled openings therein can be mechanically associated with a similar part that is not drilled, and the drilled openings in the first part duplicated exactly in the similar part.

Another object of the invention is the provision of an apparatus including means for holding a used part and an identical substituted part in predetermined relation; and providing adjustable drill guide means for positioning a drill in drilling position on the substituted part in exact duplicated relation to the drill openings occurring in the used part thus forming drilled openings in the substituted part in the identical relation in which the drilled openings occur in the used part.

Figure 1 is a perspective view of the duplicating drill jig, showing the duplication of a section of a universal joint;

Figure 2 is a front view showing the drilling of a section of pipe;

Figure 3 is a fragmentary longitudinal vertical section of a portion of the device;

Figure 4 is a longitudinal sectional view of the expansion member or clamp;

Figure 5 is a cross sectional view, showing a short hollow workpiece clamped in position.

Referring more in detail to the drawing an L-shaped standard 10 is comprised of a base 12 and an upright portion 14. The base portion is provided with a pair of end slots 16.

A cradle support block 18 is mounted on the base portion 12. It may form an integral part therewith if so desired. The base portion 12 is provided with a depression in its upper surface, shown in the drawing as a V-shaped trough 20. This portion is designed for the purpose of cradling and holding the machine portions which are being processed, and its configuration will be varied as desired. It may have a flat surface, or a flat plate (not shown) may be laid over it for supporting flat elements to be drilled. If desired the cradle block may be provided with a pair of cutout portions 22 for accommodation of varying sizes and shapes of part being processed.

A pair of clamp members 24 are pivoted at 25 to the base portion 12 and within the slot 16. The clamp portion may be in the form shown in Figure 1 with a horizontal tongue portion 28 adapted to fit into the interior surface of a pipe to be drilled or it may be a curved clamp 24' as shown in Figures 2 and 3. The portions 24 and 24' are provided with an adjusting screw 26, located above the pivot 25. A downward clamping action is effected, the clamp 24' is pivoted at the point 25. It will be seen from an examination of Figure 5 that further tightening of the wing nut 26 will cause a downward clamp action of the member 24 on the interior surface of the hollow workpiece 33'. This is true since the member 24', in the position shown in Figure 5, is vertical, and further radial rotation about the center 25 will occur in a downward direction since its path of travel is on the circumference of a circle whose center is at point 25.

For processing long lengths of pipe the pivoted elements 24 or 24' may be dropped back out of the way of the pipe, the pipe's own weight holding it sufficiently secure for machining. This is shown in Figures 2 and 3.

An expansion member or chuck clamp 30 may be of any desired design. Its purpose is the spacing and clamping of the pattern part 31 of Fig. 3 to the part 33 being processed in a given position at a given distance apart as will later be described.

A detail of one form of the spreader is shown in Figure 3. A pair of parallel bar members 32 are held against longitudinal movement with respect to each other by means of rigid studs on one member and guide apertures for receiving them in the other member. An expansion member screw 36 is operable to move members 32 with respect to each other, contracting and releasing them for adjustment and clamping them into the adjacent tubular ends of the pattern member 31, and the member 33 which is being processed.

A guide plate or table 38 is slidably carried on the upright portion 14 of the standard 10. A guide channel 40 on the underneath side of the guide plate forms a guide. A set screw 42 having an operating head 44 passes through a slot in the guide plate 38, and is adapted to be tightened to secure the guide plate 38 at any chosen position.

A drilling tool 48 is so mounted as to pass through a drill guide bushing 52 secured in an opening through the guide plate 38. An axially adjustable stylus 50 is carried on the guide plate 38 and extends a distance beneath the under surface of the guide plate. The drill and the stylus are placed a given unvarying distance apart, and preferably in a vertical plane passing through the centers of the V's in the work supporting block 18.

By means of the spreader bar 30, the adjacent ends of the parts 31 and 31' or 33 and 33' are spaced apart a distance D, which is equal to the distance between the center of the drill 48 and the center of the stylus 50. As an aid to accomplishing the desired placement, a marking such as an arrow 54 may be used to mark off a distance on the cradle 18 which is equal to the distance between the drill 48 and the stylus 50.

In the operation of the device, when it is desired to duplicate the drill holes in a universal joint, a control tube, or any other part, the pattern part, such as 31 of Figure 1, or 33 of Fig. 4, is placed on the V-cradle. The left hand end (as viewed in the drawings) is placed flush with the end of the V-block, and clamped down in that position. The part to be drilled, 31' of Fig. 1 or 33' of Figures 2, 3 and 4, is placed in the other end of the V-block, and adjusted so that the left hand end of the part to be drilled is at the position of the arrow 54 on the V-block; or at such a position that the distance D between the left hand end of the pattern part and the left hand end of the part to be drilled equals the distance D between the center of the stylus and the center of the drill.

The spreader member 30 is then adjusted by means of the set screw 36. The adjacent inner ends of the pattern part and the part to be drilled are clamped and held in place.

The table 38 is then moved so that the stylus 50 is brought into registry with a drill hole in the pattern member 31. The drill 48 is now in a position to duplicate the drill hole in the member 31'. If the stylus is placed on a drill hole whose distance is $x$ from the end of member 31, then the position of the drill will be $x$ distance from the end of the member 31'.

This operation is repeated until all of the drill holes in the pattern part have been reproduced.

For purposes of exemplification particular embodiments of the invention have been shown and described according to the best present understanding thereof. However, it will be apparent that many changes and modifications in the arrangement and construction of the parts thereof may be resorted to without departing from the true spirit and scope of the invention.

Having thus described my invention I claim:

1. A device for holding a workpiece and a pattern piece in axially aligned position for processing, the remote ends of the workpiece and pattern piece being hollow and open, said device comprising a base portion, means on said base portion for supporting said pattern and workpieces, a spacing and clamping member insertable into adjacent ends of said pattern and workpieces, said means comprising a plurality of continuously parallel radially expansible bars for securing said pattern and workpieces immovable with respect to each other, a pair of clamping arms having pivotal connection to opposite ends of said base portion, and insertable into the outward hollow, open ends of said pattern and workpieces, curved ends on said clamping arms, means for moving said arms about their pivots and urging the curved ends of said arms in a downward direction to apply downward clamping pressure upon the interior lower areas of the ends of said pattern and workpieces.

2. A drill jig for positioning and holding in substantial axial alignment a workpiece and a pattern piece, each having hollow end sections, said jig comprising a base member, means mounted on said base member for supporting the workpiece and the pattern piece and preventing lateral movement thereof, clamping arms pivoted to the opposite ends of the base member, curved tongues on the clamping arms for insertion into the remote end sections of said workpiece and the pattern piece, adjusting means mounted on the base portion and engaging each of the clamping arms for moving them about their pivots and thereby exerting downward pressure on the lowermost interior portion of the ends of the workpiece and pattern piece, an expansion and spacing clamp comprising a plurality of continuously parallel bar members insertable and adjustable in the adjacent ends of said workpiece and said pattern piece and extending coaxially therewith, means for expanding said parallel bars radially within the workpiece and the pattern piece to space and clamp them immovably with respect to each other, said means being operable from an outside lateral face of one of said bars.

3. A jig for positioning and holding a workpiece and a pattern piece, each having hollow end sections, said jig comprising a base member, means mounted on said base member for supporting the workpiece and the pattern piece, clamping arms pivoted on the base member, curved tongues on the clamping arms for entering into the remote hollow ends on said workpiece and said pattern piece for exerting downward pressure on the lower interior area of said hollow ends when said clamping arms are moved about their pivots, and means for adjustably moving said clamping arms about their pivots and holding them in adjusted position.

References Cited in the file of this patent

UNITED STATES PATENTS

| 661,322 | Ranz | Nov. 6, 1900 |
| 1,745,660 | Denning | Feb. 4, 1930 |
| 2,290,430 | Heiser | July 21, 1942 |
| 2,732,734 | Polliard | Jan. 31, 1956 |

OTHER REFERENCES

"Improved V-Block for Drilling," Page 895 of American Machinist, December 7, 1922.